J. W. HORNSEY.
PROCESS OF TREATING MATERIALS.
APPLICATION FILED JULY 15, 1910. RENEWED JUNE 24, 1916.
1,214,164.
Patented Jan. 30, 1917.
3 SHEETS—SHEET 2.
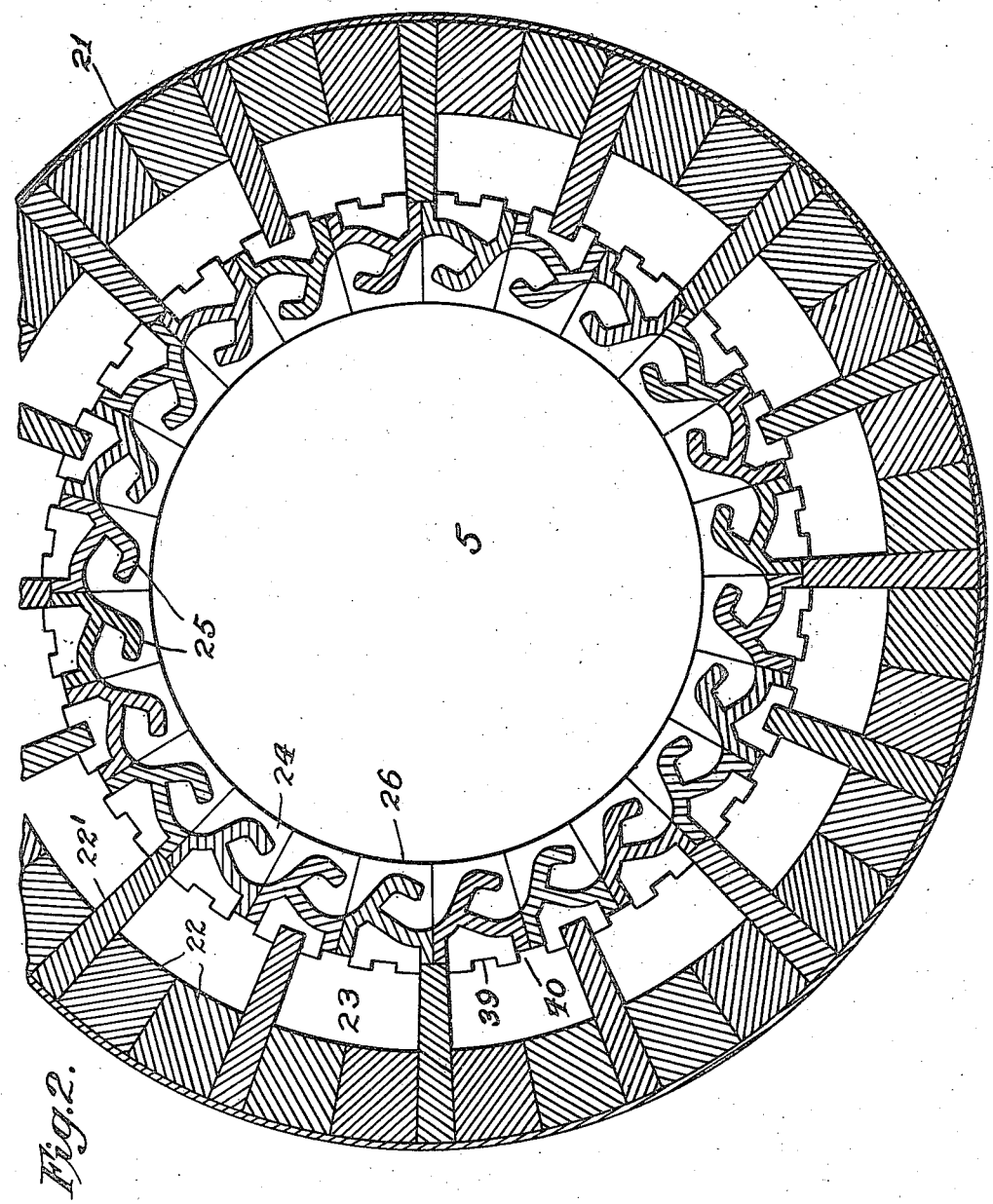

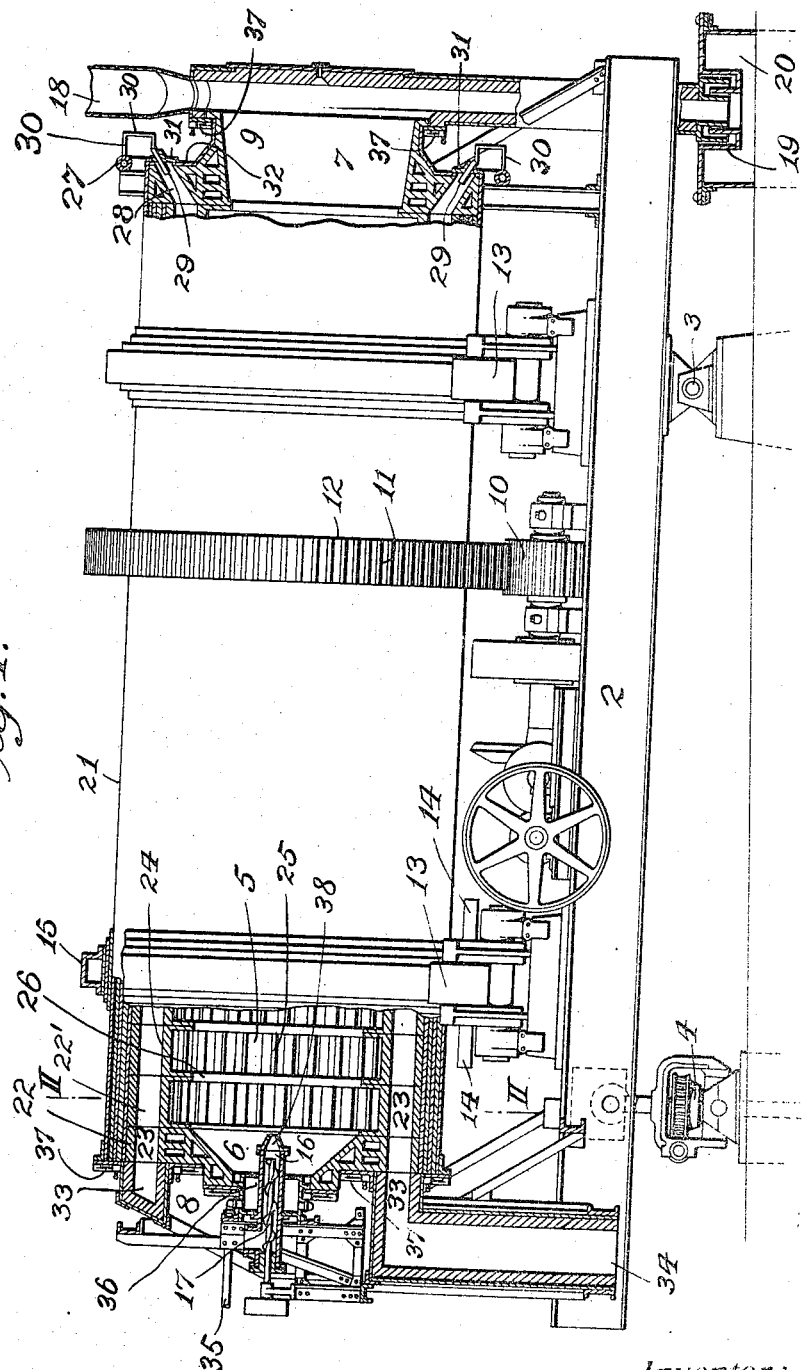

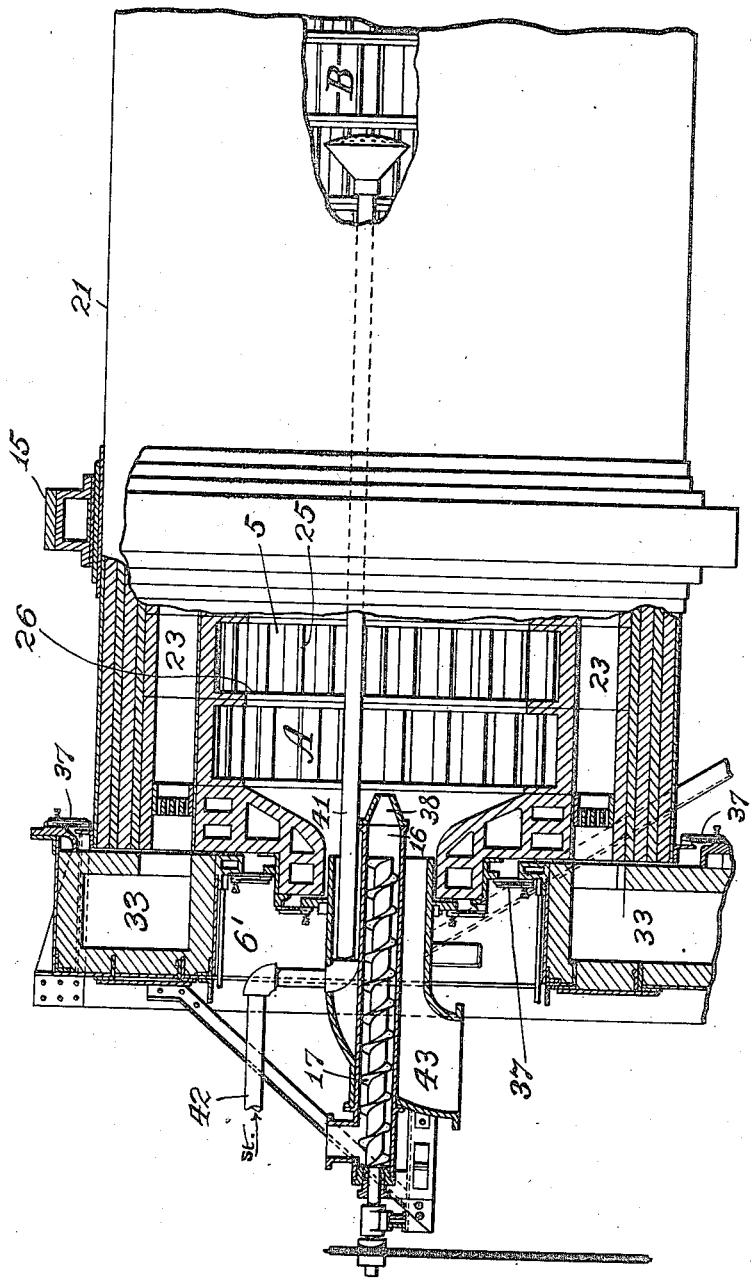

UNITED STATES PATENT OFFICE.

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

PROCESS OF TREATING MATERIALS.

1,214,164.

Specification of Letters Patent. 
Patented Jan. 30, 1917.

Application filed July 15, 1910, Serial No. 572,134. Renewed June 24, 1916. Serial No. 105,722.

*To all whom it may concern:*

Be it known that I, JOHN W. HORNSEY, a citizen of the United States, residing at Summit, Union county, New Jersey, have invented a new and useful Process of Treating Materials, of which the following is a specification, reference being had to the accompanying drawings, in which—

Figure 1 shows apparatus with a refractory lining shown partly in section and partly in elevation, suitable for carrying out my invention; Fig. 2 is an enlarged section on lines II—II of Fig. 1; Fig. 3 is a modified form of my apparatus.

My invention relates to a process for effecting decomposition, transformation or change in materials by the transfer of heat to or from the material, combined with the action of a chemical reagent, or reagents, and is especially designed to accomplish this in a closed chamber by a continuous operation. The required heat for effecting the change desired, is imparted to or abstracted from the material by passing currents of a heat supplying or absorbing medium through suitable flues or chambers in the apparatus, although, in some instances, this effect may be augmented or replaced by a heating or cooling action produced by the material itself while undergoing treatment.

In carrying out my process I pass material in an agitated and sub-divided condition through an inclosing chamber, in contact with a chemical reagent, and repeatedly impinge the particles of the material or the chemical reagent or both, upon heat supplying or absorbing surfaces,—the temperature of which, while constant at any given point, varies progressively in an ascending or descending degree in the path of the material as it travels through the chamber;— and in this manner I apply heat uniformly to or abstract it from all of the particles of the material, and at the same time bring the material into such intimate contact with the chemical reagent that I am enabled to effect the desired decomposition, transformation or change at the most efficient temperature, and with the minimum expenditure of heat energy and with the minimum quantity of reagent. For instance, I am enabled to manufacture water-gas by the intimate and constant admixture of carbon-containing particles with steam, in a continuous manner, without depending upon the carbon-containing particles themselves to supply the requisite heat, and without bringing either the carbon-containing particles or the reagent—steam—into contact with the heat-supplying medium. The repeated impingement of the material or the reagent or both on the heated surfaces tends to disrupt the particles, exposing fresh surfaces to the action of the heat, and also of the chemical reagent. By reason of the continuity of the process I am able to recover a larger yield of gas.

My process may be carried out at any desired sub or super-atmospheric temperature or pressure. A reagent may be used which will produce either an oxidizing or a reducing atmosphere as desired.

I shall herein show and describe apparatus in forms which I have found to be preferable for actual use in practising my process, but it will be understood that many changes may be made, and that the forms here illustrated and described constitute merely preferred forms of apparatus by which may invention may be practised.

Referring to the drawings, 2 is a horizontal base supported preferably at one of its ends upon a shaft 3 and at its other end having suitable jacking mechanism 4 which acts not only as a support for that end, but also as a means by which the inclination of the chamber 5 may be varied to accelerate or retard the passage of the material through the chamber 5.

While I have shown the chamber 5 in the form of a cylinder, which I prefer. it may be made in other forms and serve the same purpose. This cylinder 5 at its feed end 6 and its discharge end 7, is adapted to rotate in the fixed heads 8 and 9. The cylinder is rotated by the gear wheel 10, driven by any suitable means, which meshes with the teeth 11 of the girth gear 12.

The cylinder is supported by the roller bearings 13, of which I preferably use two sets, one near each end of the cylinder. In connection with one of these sets I employ horizontally disposed thrust rollers 14 which bear on the ring 15 and hold the cylinder 5 against longitudinal movement.

Projecting through the head 8 is an intake 16 through which the material is introduced. I have shown a screw conveyer 17 which is specifically adapted for handling solid materials. In the fixed head 9 is a gas discharge opening 18 through which any gaseous or vaporous substance generated in the cylinder is led away for further treatment. 19 is a water seal and 20 is a receptacle connected therewith in which any solid material discharged from the cylinder is deposited. I may, if I desire, dispense with the water seal 19, and instead thereof discharge the material directly into the receptacle 20, which would be in this case filled with water above the bottom of the discharge head.

The cylinder 5 is formed of a casing 21, preferably of metal within which are located segmental blocks 22 and 22' of material such as fire-brick, asbestos, or the like, which serve to retain the heat in the cylinder, and also the blocks 22' act as supports for an inner circle of blocks 24 made of fireclay or other refractory or non-corrosive material, to resist the action of the heat, or of the reagent, or both. The spaces bounded by the blocks 22, 22' and 24 form flues 23 to carry the heating gases. The blocks 24 are formed with bucket-shaped or shelf-like inner surfaces 25 for repeatedly raising and distributing the material to be treated as the cylinder rotates.

26 are circumferential ribs formed by the ends of blocks 24 and are designed to interrupt or retard the longitudinal travel of the material. The fuel gas header 27 supplies the fuel which is burned in the heating flues 23, which lead out of an annular passage 28. Projecting into this passage 28 are a series of fixed burners 29 connected by suitable branch piping 30 with the header 27. The burners 29 are mounted in plates 31 which adjoin the vertical faces 32 of the cylinder 5. Instead of this system of fixed burners and piping, I may use burners rotating with the cylinder or connect the annular passage 28, by means of suitable flues, with a furnace of any approved type adapted to consume any kind of fuel, in such manner as to generate heating gases, in the volume and of the calorific intensity requisite to produce the results desired.

At the feed end 6 of the cylinder 5 the heating flues 23 lead into an eduction passage 33 in the fixed head 8 from which an outlet 34 is provided.

35 is a supply pipe for the distributer box 36 through which the reagent, if a gas or vapor, may be introduced. If the reagent be a liquid or a solid it may be introduced by any suitable means, preferably by previous admixture with the material.

The joints between the ends of the rotating cylinder and the fixed heads should be air and gas tight and this may be accomplished by any suitable means. I prefer, however, to use the adjustable, flexible, annular plates 37.

When the pressure inside of the cylinder 5 varies materially from that of the atmosphere, I provide at the inward extremity of the intake 16, the tapered conical nozzle 38 which is so proportioned that as the material is forced inward by the conveyer 17 it will pack together in the form of a plug. The nozzle 38 is removable, and other similar nozzles, but of varying length and taper, may be substituted in order to accommodate material of varying consistencies. The object of the plug of material within the nozzle 38 is to prevent leakage of gaseous or volatile products from the cylinder through the intake 16, or of atmospheric air into the cylinder. Any other suitable means for excluding air and for preventing leakage of the gas may be used instead of the nozzle 38.

In Fig. 2 I have shown notches or mortises 39 and 40 in the outer portions of the blocks 24. These notches are intended to fit upon the blocks 22'. By placing the notches 39 in juxtaposition with the notches 40 of the next succeeding circular row of segmental blocks 24 in the cylinder, it is obvious that the buckets 25 of the alternate rows may be staggered.

The distributing cups or buckets 25, which may be of any desired shape, inclination or capacity, are, particularly when staggered as heretofore described, of marked advantage when either the material, the reagent, or a product is gaseous or vaporous in form, as these distributing cups or buckets 25 are adapted to spill their contents in an approximately even and uniformly distributed shower, thus preventing the gas or vapor from passing out of the cylinder without coming into contact with the solid particles.

I carry out my process in the following manner: The cylinder having been started in rotation, I feed the material to be treated, preferably in a finely divided condition if a solid, into the cylinder 5 through the intake 16. The material is advanced by the rotation and inclination of the cylinder toward the discharge end 7, but is retarded by the ribs 26, and by reason of the rotation of the cylinder and the action of the buckets, the material is broken up and kept in an agitated and subdivided state in intimate contact with the reagent. In this manner the separated particles of the material, or the reagent, or both, are constantly and repeatedly impinged upon the heating surfaces of the blocks 24, by which action the transfer of heat is rapidly and efficiently accomplished, resulting finally in the completion of the desired decomposition, transformation or change. As the material and the reagent travel through the cylinder in contact with the walls of the flues 23, or in juxtaposition thereto, the desired decomposition, transformation or change is gradually and progressively accomplished, the resulting product being evenly and uniformly treated at the discharge end of the cylinder.

In the manufacture of water gas for which I preferably use material which has previously been coked, I admit steam into the cylinder through the distributer box 36 in sufficient quantities to convert the carbon of the coke or other material into carbon monoxid gas by its combination with the oxygen evolved on decomposition of the steam. Since the material treated is not in form a compact mass, it is not necessary to force the steam through the material in a blast, a steam atmosphere being all that is required. While I have described the introduction of steam into the cylinder, water may be introduced which will be readily converted into steam, since I contemplate using temperatures within the cylinder of from 1800° to 2000° F. or even higher. When desired, the gas may be enriched or carburetted by introducing oil or other like materials into the chamber through the intake 16, or through the pipe 35 with the steam.

Instead of introducing steam as a reagent, I may introduce an oxygen-yielding gas, such as carbon dioxid, or a mixture of carbon dioxid and air, or a mixture of steam and other gases, as in the manufacture of "producer" gas. In such a case the carbon dioxid will yield part of its oxygen to the carbon contained in the cylinder, and the resulting gas will be carbon monoxid, either mixed with other gases or not. I may, in this manner, form a "producer" gas, by supplying a proper proportion of steam and products of combustion—which products of combustion have already been utilized to heat the flues 23. There are many other analogous uses which will readily suggest themselves to those skilled in the art.

The material when treated in my preferred manner, moves in one direction through the cylinder (from left to right, as shown in the drawings), whereas, the heat supplying medium moves through the heating flues 23 in the other direction (from right to left, as illustrated), and this arrangement has marked practical advantages in treating many kinds of materials,—as the heating gases in the flues 23 cause the heating surfaces at the end of the cylinder at which they enter, to be hotter than at the other end of the cylinder, the intermediate portions gradually and progressively decreasing in temperature so that the material and the reagent are subjected to a progressively increasing temperature as they advance from one end of the cylinder to the other, and, when they arrive at the end of the cylinder at which they are discharged, are subjected to the highest temperature, at which point the material is generally more repellent to the action of heat and requires a higher temperature in order to complete the process. This counterflow of heating gases and material results in a more efficient transfer of heat to the material and the reagent, a more effective reaction between them, and a more perfect and uniform resulting product. It is understood, however, that I do not limit myself to the use of this counterflow of heating gases and material; but I may, instead thereof, introduce the material and heating gases at the same end of the apparatus, and the reagent at the opposite, or at the same end; or I may make any combination or arrangement for the introduction of the heating gases, the material and the reagent, and for the withdrawal of the resulting products, that may best comply with the requirements of the particular process I desire to practise, which arrangements are so obvious as not to require illustration, and in no way involve a departure from the spirit of my invention.

It will be noted that the temperature controlling medium does not come into direct contact with the material undergoing treatment, or with the reagent or the products produced, but that the transfer of heat takes place by conduction or radiation.

In Fig. 3 I show a modification which is adapted for the manufacture of both coal gas and water gas in the same cylinder. This cylinder is similar to that shown in Fig. 1 except as stated. As the feed end 6', at which the coal is admitted, is more remote from the source of heat, the heat in the cylinder will diminish toward the feed end, thus supplying a lower degree of heat for making coal gas and transforming the coal into coke, while the opposite end of the cylinder supplies a higher degree of heat for making water gas. At the feed end 6' of the cylinder is the steam pipe 41 to which steam is supplied through the tube 42. 43 is an offtake through which part of the gas (consisting chiefly of coal gas) is drawn off, while the rest of the gas (consisting chiefly of water gas) is withdrawn through the discharge opening at the opposite end of the cylinder, this opening being of the same character as that marked 18 on Fig. 1. If desired, however, all of the gas (that is, coal and water gas mixed together) may be withdrawn through either opening. It will be seen that the coal gas will be generated in the part of the cylinder marked A and that the material on becoming coked, will be advanced into the part B in which an atmosphere of steam is maintained. The gas produced in this part B from the coked material will be water gas and this may be carried off through the discharge opening, while the waste or ash may be passed through a water seal into a tank, as described above.

An important advantage of my invention is the continuous operation of the apparatus which can be run for an indefinite period since the material and the reagent are fed in automatically and continuously, and the gaseous and other products are discharged in the same manner.

Obviously, the apparatus used in carrying out my process may be modified in many ways without departing from the spirit of my invention, as, for instance, the temperature controlling flues 23 may be circumferentially disposed as shown, or may be in the form of one or more tubular passages, centrally or circumferentially disposed within the cylinder, for instance, any temperature medium which supplies heat by conduction or radiation, instead of the specific means described and shown herein may be employed if desired.

It is to be understood that I do not confine myself to the specific form of apparatus which I have shown and described, but I may utilize any equivalent form of apparatus equally well adapted to the carrying out of my process.

I desire to claim:

1. The process of continuously making water gas which consists in introducing carbonaceous material and steam into a closed vessel in the presence of a source of heat out of contact with the material maintaining the particles of the material in a series of falling showers down through the vessel whereby the steam as it passes through the vessel is brought into repeated and shifting contact with the particles of the material.

2. The process of making water gas continuously, which consists in feeding carbonaceous material into a closed vessel in the presence of a source of heat out of contact with the material, introducing steam into the vessel, and maintaining the particles of the material in a condition of separation and subdivision by repeatedly lifting and showering the particles down through the vessel thereby presenting all surfaces of the material again and again to the action of the heat and the steam.

3. The process of making water gas, which consists in introducing carbonaceous material and steam into a closed vessel in the presence of externally applied heat, maintaining the particles of the material in a series of falling showers down through the vessel whereby each particle has all of its surfaces repeatedly exposed to the action of the heat and the steam, and the seared surfaces of the particles are again and again broken off and fresh surfaces again and again presented to the action of the heat and the steam whereby gasification of the material is substantially completed.

4. The process of producing water gas, which consists in introducing carbonaceous material continuously into an externally heated revolving vessel, introducing steam into the vessel while the vessel is revolved to cause the material to be picked up and showered down in the interior of the vessel to maintain the material in a finely divided and comminuted condition, thus exposing the separated particles of the material to the action of the steam and heat, the shock of the falling particles being adapted to disrupt their seared surfaces and present fresh surfaces to the action of the heat and steam with each revolution of the vessel.

5. The process of producing water gas which consists in introducing carbonaceous material continuously into an externally heated vessel, passing steam through falling veils of the material and again and again subjecting the surfaces of the material in a separated and unsupported condition to the action of the heat and the steam whereby the material is substantially gasified.

6. The process of continuously making water gas, which consists in introducing carbonaceous material and steam into a closed vessel, maintaining the particles of the material in a series of falling showers down through the vessel, whereby the steam as it passes through the vessel is brought into repeated and shifting contact with the particles of the material, and subjecting the material to the action of a counter-flowing source of heat out of contact with the material.

7. The process of treating materials, which consists in introducing materials continuously into an externally heated vessel in the presence of a gaseous reagent, causing the gaseous reagent to repeatedly pass through falling veils of the material and again and again subjecting the surfaces of the material in a separated and unsupported condition to the action of the heat and the gaseous reagent, the passage of the gaseous reagent through the vessel being repeatedly interrupted by the falling showers of the material, thereby causing a substantially complete reaction between the material and the gaseous reagent.

JOHN W. HORNSEY.

Witnesses:
R. I. MIDDLETON,
G. HAUSER.